(12) United States Patent
Ott et al.

(10) Patent No.: US 6,485,793 B1
(45) Date of Patent: Nov. 26, 2002

(54) AQUEOUS DISPERSION OF TRANSPARENT POWDER COATING MATERIAL

(75) Inventors: Günther Ott, Münster (DE); Joachim Woltering, Münster (DE); Uwe Meisenburg, Duisburg (DE); Rainer Blum, Ludwigshafen (DE); Maximilian Bendix, Oelde (DE); Rainer Königer, Mannheim (DE); Horst Binder, Lampertheim (DE); Reinhold Schwalm, Wachenheim (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/762,119

(22) PCT Filed: Jul. 24, 1999

(86) PCT No.: PCT/EP99/05304

§ 371 (c)(1),
(2), (4) Date: Mar. 2, 2001

(87) PCT Pub. No.: WO00/08107

PCT Pub. Date: Feb. 17, 2000

(30) Foreign Application Priority Data

Aug. 4, 1998  (DE) ......................................... 198 35 206

(51) Int. Cl.$^7$ ................................................ B05D 3/06
(52) U.S. Cl. ...................... 427/508; 427/517; 427/375
(58) Field of Search .............................. 427/385.5, 508, 427/517, 375

(56) References Cited

U.S. PATENT DOCUMENTS

| | | | |
|---|---|---|---|
| 3,341,580 A | 9/1967 | Hechenbleikner | 260/541 |
| 3,477,990 A | 11/1969 | Dante et al. | 260/47 |
| 3,781,379 A | 12/1973 | Theodore et al. | 260/836 |
| 3,974,303 A * | 8/1976 | Iwase et al. | 427/185 |
| 4,064,161 A | 12/1977 | Sheldon et al. | 526/320 |
| 4,091,048 A | 5/1978 | Labana et al. | 260/836 |
| 4,129,488 A | 12/1978 | McGinniss | 204/159.19 |
| 4,268,542 A | 5/1981 | Sakakibara et al. | 427/195 |
| 4,939,213 A | 7/1990 | Jacobs, III et al. | 525/329.9 |
| 5,084,541 A | 1/1992 | Jacobs, III | 528/45 |
| 5,558,911 A | 9/1996 | Blum | 427/517 |
| 5,965,213 A * | 10/1999 | Sacharski et al. | 427/475 |
| 6,011,078 A * | 1/2000 | Reich et al. | 522/86 |

FOREIGN PATENT DOCUMENTS

| | | |
|---|---|---|
| BE | 756 693 | 3/1971 |
| DE | 22 14 650 B2 | 3/1972 |
| DE | 24 36 186 A1 | 7/1974 |
| DE | 27 49 576 B2 | 11/1977 |
| DE | 42 03 278 A1 | 2/1992 |
| DE | 44 13 436 A1 | 4/1994 |
| DE | 196 00 147 A1 | 4/1996 |
| DE | 196 13 547 | 4/1996 |
| DE | 19740757 * | 3/1999 |
| EP | 0 299 420 A2 | 7/1988 |
| EP | 0 410 242 A2 | 7/1990 |
| EP | 0 585 742 B1 | 8/1993 |
| EP | 0 624 577 A1 | 5/1994 |
| EP | 0 636 669 A2 | 7/1994 |
| EP | 0 650 978 A1 | 10/1994 |
| EP | 0 650 979 A1 | 10/1994 |
| EP | 0 650 985 A1 | 10/1994 |
| JP | 03-062801 * | 3/1991 |
| WO | WO 93/25596 | 12/1993 |
| WO | WO 96/32452 | 10/1996 |
| WO | WO 97/25157 | 7/1997 |
| WO | WO 97/25361 | 7/1997 |
| WO | WO 98/28345 | 7/1998 |

OTHER PUBLICATIONS

Kirk–Othmer Encyclopedia of Chemical Technology, Fourth Edition, vol. 1, pp. 314 and 332.*

* cited by examiner

Primary Examiner—Erma Cameron

(57) ABSTRACT

The present invention relates to an aqueous dispersion comprising a solid pulverulent component A and an aqueous component B, said component A comprising a UV-curable powder coating material.

26 Claims, No Drawings

AQUEOUS DISPERSION OF TRANSPARENT POWDER COATING MATERIAL

The present invention relates to an aqueous dispersion of UV-curable powder coating materials which are applied to substrates and then, following partial or complete evaporation of the water and heating to form a film of the powder particles, are cured by means of high-energy radiation, preferably UV light, to give crosslinked coating films. They are particularly suitable for auto bodies made of sheet metal and/or plastic, applied by means of electrostatically assisted high-speed rotation or pneumatically, as a coating for car bodies coated with waterborne basecoat.

Liquid coating materials are presently used with preference for the coating of car bodies. Such materials give rise to numerous environmental problems owing to their solvent content. This also applies to the use of waterborne coating materials.

It is for this reason that increased efforts have been made in recent years to use powder coating materials for the coating. The result to date, however, have not been satisfactory; in particular, increased coat thicknesses are necessary in order to obtain a uniform appearance.

Further serious problems of powder coating materials for thermal curing arise from the requirement for blocking resistance on storage and storability even in summer temperatures. In order to ensure that this requirement is met, the softening point of the coating powders must be high. Because of the high softening point of the coating materials, however, the heat-activated crosslinking reaction begins prematurely during the melting of the powders on the substrate, before the film surface has achieved optimum leveling. To solve this problems, UV-curable powder coating materials are proposed in which it is possible to separate the melting operation from the crosslinking. The UV powder coating materials which have been disclosed to date are all based on substances containing acrylic or vinylic unsaturation, which owing to the high melting temperature required for good blocking resistance can also undergo thermal polymerization prior to UV irradiation. In order to guarantee blocking resistance, the binders employed for the UV powder coating materials must be absolutely solvent-free polymers, which are highly problematic to obtain owing to their tendency to undergo thermal polymerization.

A further problem with the use of powder coating materials is that they cannot be used on existing plants designed for liquid coating materials, because of the different application technology. This was the spur to the development of powder coating materials in the form of aqueous dispersions which can be processed using liquid coating technologies. Examples of the publications in this field are DE 196 13 547.8-43 and DE 195 18 392.4.

U.S. Pat. No. 4,268,542, for example, discloses a process which uses a powder coating slurry that is suitable for the coating of cars. In this process, a conventional powder coat is first applied to the bodywork, and the transparent coating slurry is applied as a second coat. This transparent coating slurry, based on acrylate resins, uses ionic thickeners which result in relatively high sensitivity of the applied coating film to moisture, especially to condensation. Furthermore, in one of the examples these contain from 0.5 to 30% of glycidyl-containing monomers. Moreover, it is necessary to operate with high stoving temperatures (more than 160° C.).

However, the general problem of heat-activated crosslinking when the water is evaporated off and the resultant covering of powder coating material is melted is still not always solved using this technology, since crosslinking does not start at a sharply defined temperature but instead starts gradually, before the water has fully evaporated and an optimum surface has formed. Following the onset of the crosslinking reaction, water still emerging as a result of the high temperatures required is the cause of bubbles and craters.

In the text below, the terms transparent powder coating dispersion and transparent powder coating material are used synonymously.

It is an object of the present invention to provide an aqueous dispersion, comprising a solid pulverulent component A and an aqueous component B, which can be applied to car bodies by means of the conventional liquid coating technology and which is UV-curable.

We have found that this object is achieved when component A comprises a UV-curable powder coating material.

The technical advantages of the dispersion of the invention lie in the possibility of using UV powder coating materials having a markedly lower softening point than in the case of dry application, since the particles in the dispersion are unable to cake together. This lower softening temperature results in surfaces which exhibit good flow and are retained since it is not necessary to heat them to high "stoving" temperatures for the purpose of crosslinking. It has in fact been found, completely surprisingly, that UV curing, with a minimal residual water content of the melted film, takes place particularly quickly and completely. Accordingly, the natural equilibrium between the water content in the film and in the ambient air, which is dependent on the hydrophilicity of the crosslinking coating films, is quickly established as early as during cooling. A further important advantage is the energy saving due to the lower drying and melting temperatures.

Since the UV powder coating dispersions are self-crosslinking systems, the homogenization of binder, crosslinker and additives by means, for example, of extrusion is not absolutely necessary, in contradistinction to thermally crosslinking powder coating materials.

Suitable UV-curable powder coating materials are the binders known from the prior art. Particularly suitable are acrylate resins having lateral functional groups such as, for example, epoxy groups or hydroxyl groups, with molecular weights in the range from Mn 1000 to 10,000 with molecular weight distributions <4, as are described, for example, in DE 4203278, which are subsequently reacted with acrylic acid or acrylic acid derivatives, such as acryloyl chloride, to give the corresponding acrylated acrylates (EP 650979).

Functional resins which can be employed are preferably those containing aliphatic compounds. For example, epoxy-containing binders with a glycidyl-containing monomer content of from 5 to 45% by weight, preferably from 25 to 40% by weight, are suitable.

Copolymers containing epoxy groups can be prepared either with acrylic acid, methacrylic acid or mixtures of these. It is likewise possible to use mixtures of acrylic acid, methacrylic acid and (meth)acrylic anhydride.

Particularly suitable are the acrylate resins that are described in DE 203278 and have lateral functional groups, e.g. epoxy groups or hydroxyl groups, which are preferably reacted with acrylic acid or acrylic acid derivatives, e.g. acryloyl chloride, to give the corresponding acrylated acrylates (cf. EP 650 979).

Examples of suitable epoxy-functional binders for the solid transparent powder coating material are polyacrylate resins which contain epoxy groups and are preparable by copolymerization of at least one ethylenically unsaturated monomer which contains at least one epoxy group in the molecule with at least one further ethylenically unsaturated monomer which contains no epoxy group in the molecule, at least one of the monomers being an ester of acrylic acid or methacrylic acid. Polyacrylate resins of this kind, containing epoxy groups, are known, for example, from EP-A-299 420, DE-B-22 14 650, DE-B-27 49 576, U.S. Pat. No. 4,091,048 and U.S. Pat. No. 3,781,379.

Examples of ethylenically unsaturated monomers which contain no epoxy group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxy groups in the molecule are acid amides, such as acrylamide and methacrylamide, maleamide (MAA), vinylaromatic compounds such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate.

The epoxy-functional monomers employed in the epoxy-functional binders are preferably glycidyl acrylate, glycidyl methacrylate, allyl esters and allyl glycidyl ether.

The polyacrylate resin containing epoxy groups typically has an epoxide equivalent weight of from 400 to 2500, preferably from 420 to 700, a number-average molecular weight (determined by gel permeation chromatography using a polystyrene standard) of from 2000 to 20,000, preferably from 1000 to 10,000, and a glass transition temperature ($T_g$) of from 30 to 80, preferably from 40 to 70 and, with particular preference, from 40 to 60° C. (measured by means of Differential Scanning Calorimetry (DSC)). About 50° C. is very particularly preferred. The molecular weight distributions lie preferably below 6, with particular preference below 3. Suitable acrylate resins are described, for example, in DE 203278. It is also possible to employ mixtures of two or more acrylate resins.

The polyacrylate resin containing epoxy groups can be prepared by polymerization in accordance with methods which are generally well known.

In addition, the functional resins may also feature aromatic compounds. The proportion of such compounds should be below 30%, preferably below 20%. They can, for example, comprise vinylaromatic compounds. An example of such is styrene.

In addition, it is possible to employ:
  unsaturated polymers of a wide variety of polymer types with 0.5–3.5 double bonds per 1000 molar weight, which are obtained by polymer-analogous reaction of polymers with unsaturated substances (DE 24 36 186).
  Polymethacrylates of low molecular weight (500–2500) and narrow distribution, which are obtained by anionic polymerization and are functionalized by polymer-analogous reaction with double bonds (U.S. Pat. No. 4,064,161).
  Blends of solid epoxy acrylates by reaction of diepoxy resins with acrylic acid and partially crystalline solid polyester acrylates from carboxyl-terminated polyester by reaction with glycidyl acrylates (U.S. Pat. No. 4,129,488).
  Unsaturated polyurethane acrylates with a melting range of 50–180° C. (EP 410 242).
  Blends comprising unsaturated polyurethane acrylates with unsaturated crystalline polyesters for improving the blocking resistance (EP 585 742).
  Blends of unsaturated polyesters or polyacrylates with polyurethane vinyl ether (EP 636 669).
  Functional polyacrylates formed from olefinically unsaturated monomers by reaction of functionally complementary polyacrylates (EP 650 978).
  Embodiment relating to EP 650 978, in which the base polymers are prepared in a high-temperature polymerization (EP 650 985).
  Double-bond-free polyacrylates are crosslinked by way of H transfer to photochemically excited, copolymeric photoinitiators of the Norrish type II (DE 44 13 436).
  Double-bond-free polyacrylates comprising dihydrodicyclopentadienol acrylate are crosslinked by way of H transfer to photochemically excited, copolymeric photoinitiators of the Norrish type II (DE 196 00 147).
Further systems for binders A:
  PCT/EP 96/05769 crosslinked polymeric compounds having at least one ethylenic double bond with organic compounds containing at least one hydrogen atom having a bond energy of max. 397 kJ/mol.
  PCT/EP97/07074 discloses a process for preparing radiation-crosslinkable acrylate polymers by polymer-analogous reaction of polyacrylates with substances which introduce a group which forms free radicals with actinic radiation.

Component A can comprise one or more of the substances mentioned. Their preparation can take place in accordance with the methods specified there, without the selection of component A being restricted to substances from these documents.

The photoinitiators required for UV crosslinking are generally present in components A and are in general selected from the substances known from the prior art. Polymers according to DE 44 13 436 and DE 196 00 147 are UV-curable without added photoinitiators. Particularly well-crosslinked films are obtained using components A which comprise mixtures of unsaturated polymers and polymers according to DE 44 13 436 and DE 196 00 147 having a particularly high proportion of photochemically excitable, copolymeric photoinitiators of Norrish type II, which in this case function as polymeric photoinitiators.

The component A can consist of unitary binders or of blends of different binders, in which not all of the constituents need be UV-crosslinkable. It may also be advantageous to use UV-curable binders in combination with heat-curable binders; in this case, interpenetrating networks having particularly advantageous film properties are formed.

In addition, component A can comprise crosslinkers, so that the photochemical curing may be supplemented by thermal crosslinking as well.

Suitable crosslinkers are carboxylic acids, especially saturated, straight-chain, aliphatic dicarboxylic acids having 3 to 20 carbon atoms in a molecule. Very particular preference is given to the use of 1,12-dodecanedicarboxylic acid. To modify the properties of the finished transparent powder coating materials it is possible, if desired, to employ other carboxyl-containing crosslinkers. As examples of these, mention may be made of saturated branched or unsaturated straight-chain dicarboxylic and polycarboxylic acids and also polymers having carboxyl groups.

Also suitable, furthermore, are transparent powder coating materials which comprise an epoxy-functional crosslinker and an acid-functional binder.

A further example comprises tris(alkoxycarbonylamino)-triazines in accordance with U.S. Pat. No. 4,939,213, U.S. Pat. No. 5,084,541 and EP 0 624 577.

These documents relate to tris(alkoxycarbonylamino)-triazines of the formula

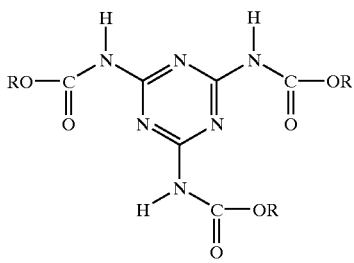

in which R denotes methyl, butyl or ethylhexyl groups. It is likewise possible to employ derivatives of said compounds.

In accordance with the invention, preference is given to the methyl/butyl mixed esters. These have the advantage over the pure methyl esters of improved solubility in polymer melts relative to butyl/ethylhexyl mixed esters. In accordance with the invention, preference is also given to the pure butyl esters.

The tris(alkoxycarbonylamino)triazines and their derivatives can also, in accordance with the invention, be employed in a mixture with conventional crosslinking agents (component C). Particularly suitable in this case are blocked polyisocyanates which differ from the tris(alkoxycarbonylamino)triazines. It is also possible to employ amino resins, examples being melamine resins.

In principle it is possible to employ any amino resin suitable for transparent topcoats, or a mixture of such amino resins.

Resins of this kind are well known to the skilled worker and are offered by numerous companies as commercial products. Amino resins are condensation products of aldehydes, especially formaldehyde, with, for example, urea, melamine, guanamine and benzoguanamine. The amino resins contain alcohol groups, preferably methylol groups, some or all of which are generally etherified with alcohols. Otherwise, it is also possible to use any other suitable crosslinking agent known from the prior art, examples being blocked polyfunctional isocyanates.

Examples of suitable acid-functional binders are acidic polyacrylate resins, which are preparable by copolymerizing at least one ethylenically unsaturated monomer containing at least one acid group in the molecule with at least one further ethylenically unsaturated monomer which contains no acid group in the molecule.

The binder which contains epoxy groups and the crosslinker which contains epoxy groups, respectively, and the carboxyl-containing binder and the carboxyl-containing crosslinker, respectively, are typically employed in amounts such that there are from 0.5 to 1.5, preferably from 0.75 to 1.25, equivalents of carboxyl groups per equivalent of epoxy groups. The amount of carboxyl groups present can be determined by titration with an alcoholic KOH solution.

In accordance with the invention, the binder can comprise vinylaromatic compounds, especially styrene. In order to limit the danger of cracking, however, the amount is preferably not more than 35% by weight. From 10 to 25% by weight are preferred.

The solid powder coating materials comprise, if desired, one or more suitable catalysts for the epoxy resin curing. Suitable catalysts are phosphonium salts of organic or inorganic acids, quaternary ammonium compounds, amines, and imidazole and imidazole derivatives. The catalysts are generally employed in proportions of from 0.001% by weight to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate/acetic acid complex, tetrabutylphosphonium iodide, tetrabutylphosphonium bromide and tetrabutylphosphonium acetate/acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole imidazole and 2-butylimidazole. These and other imidazole catalysts are described, for example, in Belgian Patent No. 756,693.

In addition, the solid powder coating materials may, if desired, comprise auxiliaries and additives. Examples of these are leveling agents, antioxidants, UV absorbers, free-radical scavengers, flow aids and degassing agents, such as benzoin, for example.

The solid powder coating materials are prepared by known methods (cf., for example, product information from the company BASF Lacke + Farben AG, "Pulverlacke", 1990) by homogenizing and dispersing, for example by means of an extruder, screw-type kneading machine and the like. After their preparation, the powder coating materials are prepared for dispersing by grinding and, if desired, by sieving and classifying.

To prepare the dispersion, component A is dispersed in an aqueous component B. Accordingly, the continuous phase is preferably water. If desired, component B contains further components by means of which the powder coating materials of the invention are dispersed and the dispersion is stabilized. By means of further auxiliaries it is possible to produce the required performance properties. Component B may comprise ionic and/or nonionic monomeric and/or polymeric surfactants and protective colloids. Selection here takes place taking into account the technical requirements in relation to the cured films. It has been found advantageous to use polymeric substances which are chemically similar to the components A and which are able to undergo co-crosslinking with the binders present in the components A in the course of UV curing. For the dispersion of the invention, substances of this kind are, for example, based on polyacrylates. They are preferably polyacrylate protective colloids which are obtained from (meth)acrylates by copolymerization with (meth)acrylic acid and in which some of the carboxyl groups are reacted with glycidyl (meth)acrylate and some more have been neutralized with nitrogen bases.

Also particularly suitable are double-bond-free binders in accordance, for example, with DE 44 13 436 and/or DE 196 00 147, which have been polymerized with fractions of (meth)acrylic acid and then neutralized, in whole or in part, with nitrogen bases. Preference is also given in accordance with the invention to the use of binderlike dispersants which have basic groups and have been (partly) neutralized with acids. An advantage of the present invention is to be able to choose freely between both cationic and anionic stabilization forms and, for example, to be able to choose the most cost-effective method or the method which is easy to conduct chemically without having to take account of the chemistry of the crosslinking reaction. For example, the binders according to DE 44 13 436 and DE 196 00 147 are inert with respect to the majority of chemical reactions and are crosslinked only by means of high-energy radiation. Such systems can then be applied to various substrates by conventional powder slurry techniques and can be cured at elevated temperature (above the melting temperature of the resin) by UV radiation or electron beams.

Polyurethane protective colloids which are particularly suitable for the dispersion of the invention based on polyurethanes are those which are obtained from isocyanates, polyols, hydroxycarboxylic acids and hydroxy(meth) acrylates and/or hydroxyvinyl ethers and are (wholly or partly) neutralized with nitrogen bases. Said protective colloids have a good dispersing action and in many cases also a desired thickening action, and are co-crosslinked with the melted powder particles in the course of UV curing, thereby resulting in extremely weather-resistant coatings.

Also suitable, however, are commercially available substances, such as anionic and cationic soaps, nonionic surfactants based, for example, on polyoxyethylene/propylene block polymers or on polyoxyethylene-fatty acid esters. Also suitable are polyvinylpyrrolidone protective colloids and polyvinyl alcohol protective colloids which have a good stabilizing and thickening action. The selection, and, if appropriate, combination of different substances is an optimization task with which the skilled worker is familiar and which takes place in each individual case in accordance with the requirements relating to the dispersion in terms, for example, of pumpability, flow behavior, viscosity or storage conditions, or in accordance with the requirements relating to the cured coating material in respect, for example, of weather resistance, overcoatability, gloss and intercoat adhesion.

The binders can be pigmented or unpigmented or, respectively, be provided with or without dyes. Preference, however, is given to unpigmented binders for the preparation of transparent powder coating materials.

As a further essential constituent the aqueous component B of the powder coating dispersion comprises at least one nonionic thickener a). Preference is given to the use of nonionic associative thickeners a). This is so in particular when pH values of 4–7 are to be observed.

Structural features of such associative thickeners a) are:
aa) a hydrophilic structure which ensures adequate solubility in water, and
ab) hydrophobic groups, which are capable of associative interaction in the aqueous medium.

Examples of hydrophobic groups employed are long-chain alkyl radicals, such as dodecyl, hexadecyl or octadecyl radicals, or alkaryl radicals, such as octylphenyl or nonylphenyl radicals, for example.

Hydrophilic structures preferably employed are polyacrylates, cellulose ethers or, with particular preference, polyurethanes, which contain the hydrophobic groups as polymer units.

Very particular preference as hydrophilic structures is given to polyurethanes which contain polyether chains as units, preferably comprising polyethylene oxide.

In the synthesis of such polyether polyurethanes, the di- and/or polyisocyanates, preferably aliphatic diisocyanates and, with particular preference, unsubstituted or alkyl-substituted 1,6-hexamethylene diisocyanate, are used to link the hydroxyl-terminated polyether units with one another and to link the polyether units with the hydrophobic end-group units, which may, for example, be monofunctional alcohols and/or amines bearing the long-chain alkyl radicals or aralkyl radicals already mentioned.

The powder coating dispersion may additionally comprise dispersing auxiliaries. Examples include aryl polyglycol ethers and octylphenol ethoxylates (in part hydrogenated).

The dispersing auxiliaries which can be employed with preference in component B include polyurethanes, inter alia.

These can consist preferably of
1. at least one organic component having at least two reactive hydrogen atoms,
2. a monofunctional ether, and
3. a polyisocyanate.

The organic component of the polyurethane composition comprises a polyester polyol, a low molecular mass diol and/or triol, or mixtures thereof. If desired, a trifunctional hydroxyl-containing monomer can be employed.

In a second preferred embodiment the polyurethane comprises
1. at least one organic component having at least two reactive hydrogen atoms,
2. a nonionic stabilizer which is prepared by reacting
   I. a monofunctional polyether with a polyisocyanate component to produce an isocyanate intermediate and
   II. a component having at least one active amine group and at least two active hydroxyl groups, and
3. at least one polyisocyanate component.

The organic component preferably comprises polyether/polyester polyol, a low molecular mass diol and/or triol, or mixtures thereof.

The polyester component can be prepared by reacting at least one dicarboxylic acid and at least one alcohol component, the alcohol comprising at least two hydroxyl groups. The carboxylic acid component comprises two or more carboxyl groups.

In addition to the carboxylic acids the polyester resin can also comprise one or more low molecular mass diols or triols. In principle, any polyol can be employed.

The polyester resins or mixtures of polyester resins employed comprise preferably terminal hydroxyl groups. This is brought about by adding an excess of polyols.

For the synthesis of the polyesters it is possible to employ both monocarboxylic acids and monoalcohols. Preferably, however, the monocarboxylic acids and/or monoalcohols are present in a very small amount by weight in the polyester resin.

The polyester diol components employed with preference comprise between 20 and 80% by weight of the polyurethane resin. The amounts are preferably between 50 and 70% by weight. Very particular preference is given to from 55 to 65% by weight.

The polyurethane is prepared employing polyester polyols having a molecular weight of between 500 and 5000. Preference is given to molecular weights of between 1000 and 3500.

In addition to the polyester diols, the polyurethane resins can comprise further organic components having at least two reactive hydrogen atoms. These are preferably diols and triols, thiols and/or amines, or mixtures of these substances. The components used to synthesize the polyester component can also be employed here as separate components. In other words, dialcohols or trialcohols, such as neopentyl glycol or 1,6-hexanediol, for example, are also suitable as an additional organic component in the polyurethane.

The molecular weight of the diols and/or triols employed in the polyurethane resin is between 0 and 20% by weight. Preference is given to from 1 to 6% by weight.

The polyurethane resin additionally comprises polyisocyanates, especially diisocyanates. The isocyanates are present at between 5 and 40% by weight based on the polyurethane mass. Particular preference is given to from 10 to 30% by weight and very particular preference to from 10 to 20% by weight. To prepare the polyurethane, finally, a monofunctional polyether is employed.

In a second variant, a nonionic stabilizer is prepared by, preferably, reacting a monofunctional polyether with a diisocyanate. The resultant reaction product is then reacted with a component which comprises at least one active amine group and at least two active hydroxyl groups.

In one particular embodiment the polyurethane comprises a reaction product of:

1. a polyester polyol, which is in turn a reaction product of a carboxylic acid having at least two carboxyl groups and a component having at least two hydroxyl groups,
2. at least one low molecular mass component having at least two hydroxyl groups,
3. at least one polyisocyanate component,
4. a nonionic stabilizer prepared by reacting a monofunctional ether with a polyisocyanate and then reacting the resultant reaction product with a component which comprises at least one active amine group and at least two active hydroxyl groups.

In a fourth variant, the polyurethane comprises a reaction product of 1. a polyester polyol,
2. at least one low molecular mass diol or triol,
3. a polyisocyanate,
4. a trihydroxyl-containing monomer,
5. a monofunctional hydroxyl-containing polyether.

The polyesters are synthesized using the above-described carboxylic acid components and an excess of polyols. The excess of polyols is chosen so that preferably terminal hydroxyl groups are formed. The polyols preferably have a hydroxyl functionality of at least two.

The polyester resin consists preferably of one or more polyols, preferably comprising one diol. Diols employed with preference are alkylene glycols, such as ethylene glycol, propylene glycol, butylene glycol and neopentyl glycol, 1,6-hexanediol or other glycols, such as bisphenol A, cyclohexanedimethanol, caprolactonediol, hydroxyalkylated bisphenol, and similar compounds.

The low molecular mass diols which are preferably employed in accordance with the invention are known from the prior art. They include aliphatic diols, preferably alkylene polyols having 2 to 18 carbon atoms. Examples of such are 1,4-butanediol and cycloaliphatic diols, such as 1,2-cyclohexanediol and cyclohexanedimethanol.

Suitable organic polyisocyanates in accordance with the invention are preferably those which comprise at least two isocyanate groups. Particular preference is given to diisocyanates, e.g. p-phenylene diisocyanate, biphenyl 4,4'-diisocyanate, toluene diisocyanates, 3,3'-dimethyl-4,4'-biphenylene diisocyanate, 1,4-tetramethylene diisocyanate, 1,6-hexamethylene diisocyanate, 2,2,4-trimethylhexane 1,6-diisocyanate, methylenebis-(phenyl isocyanates), 1,5-naphthalene diisocyanate, bis(isocyanatoethyl fumarate), isophorone diisocyanate and methylenebis(4-cyclohexyl isocyanate).

In addition to the abovementioned diisocyanates, other multifunctional isocyanates are also used. Examples are 1,2,4-benzene triisocyanate and polymethylenepolyphenyl isocyanates.

Particular preference is given to the use of aliphatic diisocyanates, examples being 1,6-hexamethylene di-isocyanate, 1,4-butylene diisocyanate, methylene-bis(4-cyclohexyl isocyanate), isophorone diisocyanate and 2,4-toluene diisocyanate.

Relatively long-chain polyurethane resins can be obtained by chain extension with components containing diol and/or triol groups. Particular preference is given to chain extenders having at least two active hydrogen groups, examples being diols, thiols, diamines and mixtures of these substances, e.g. alkanolamines, aminoalkyl mercaptans, hydroxyalkyl mercaptans, and similar compounds.

Examples of diols employed as chain extenders are 1,6-hexanediol, cyclohexanedimethylol and 1,4-butanediol. A particularly preferred diol is neopentyl glycol.

The polyethers which can be employed are preferably mono- or difunctional polyethers. The monofunctional ones include, for example, those prepared by polymerizing ethylene oxides, propylene oxides or mixtures thereof.

The polyurethane product described can be mixed with conventional crosslinkers. These include preferably amino resins, e.g. melamine. It is also possible to employ condensation products of other amines and amides, e.g. aldehyde condensates of triazines, diazines, triazoles, guanadines, guanamines or alkyl- and aryl-substituted derivatives of such components. Some examples of such components are N,N'-dimethylurea, dicyandiamide, 2-chloro-4,6-diamino-1, 3,5-triazine, 6-methyl-2,4-diamino-1,3,5-triazine, 3,5-diamino-triazole, triaminopyrimidines, 2-mercapto-4,6-diamino-pyrimidine, 2,4,6-triethyltriamino-1,3,5-triazine and similar substances.

The preferred aldehyde is formaldehyde. It is also possible to employ acetaldehyde, crotonaldehyde, acrolein, benzaldehyde and furfural.

The amine-aldehyde condensation products can comprise methylol or similar alcohol groups. Examples of alcohols which can be employed are methanol, ethanol, propanol, butanol, pentanol, hexanol, heptanol, benzyl alcohol and aromatic alcohols, cyclic alcohols, such as cyclohexanol, monoethers or glycols, and also substituted alcohols, e.g., 3-chloropropanol.

In addition to the abovementioned isocyanates it is also possible to employ blocked polyisocyanates as crosslinking agents. Examples of these include organic polyisocyanates such as trimethylene, tetramethylene, hexamethylene, 1,2-propylene, 1,2-butylene and 2,3-butylene diisocyanates. Further candidates for use include cycloalkane components such as 1,3-cyclopentane, 1,4-cyclohexane and 1,2-cyclohexane diisocyanates. It is also possible to use aromatic components such as phenylene, p-phenylene, 4,4'-diphenyl, 1,5-napthalene and 1,4-naphthalene diisocyanates. Components suitable in addition to these are aliphatic-aromatic components such as 4,4'-diphenylenemethane, 2,4- or 2,6-tolylene, or mixtures thereof, 4,4'-toluidine and 1,4-xylylene diisocyanates. Further examples are ring-substituted aromatic components such as 4,4'-diphenyl ether diisocyanates and chlorodiphenylene diisocyanates. Triisocyanates which can be employed are triphenyl-methane 4,4',4"-triisocyanate, 1,3,5-triisocyanatobenzene and 2,4,6-triisocyanatotoluene. A tetraisocyanate which can be used, finally, is 4,4'-diphenyl-dimethylmethane 2,2',5,5'-tetraisocyanate.

Blocking agents which can be employed include aliphatic, cycloaliphatic and aromatic alkyl monoalcohols. Examples of these include methyl, ethyl, chloroethyl, propyl, butyl, cyclohexyl, heptyl, octyl, nonyl (including 3,3,5-trimethylhexanol), decyl and lauryl alcohols. Examples of phenolic components which can be used are phenols or substituted phenols. Examples thereof are cresol, xylenol, nitrophenol, chlorophenol, ethylphenol, 1-butylphenol and 2,5-di-tert-buty-4-hydroxytoluene.

Further suitable blocking agents are tertiary hydroxylamines, e.g. diethylethanolamine, and oximes, such as methyl ethyl ketone oxime, acetone oxime and cyclohexanone oxime.

The crosslinking agents described are present in the polyurethane dispersion in amounts from 2 to 15% by weight, preferably from 4 to 8% by weight.

The polyurethane obtained can be present in the powder slurry in a proportion of from 2 to 20% by weight, preferably from 5 to 15% by weight.

One particularly preferred embodiment relates to nonionic (associative) thickeners which are able to react photochemically with themselves and/or with the other binders A, so further improving the coating properties. Photochemically active nonionic thickeners can be obtained by incorporating double bonds or groups having readily abstractable hydrogen atoms, such as dicyclopentadienyl groups and/or photoinitiator groups of the Norrish II type, especially benzophenone groups.

The aqueous dispersion of transparent powder coating material can be prepared from the components A and B by wet grinding or by stirred incorporation of the dry-ground powder coating material present in component A. Particular preference is given to wet grinding.

The present invention also provides a process for preparing an aqueous dispersion of powder coating material on the basis of the above-described component A, which in accordance with the invention is dispersed in a component B. The latter consists of an aqueous dispersion of catalysts, auxiliaries, antifoams, antioxidants, wetting agents, UV absorbers, free-radical scavengers, biocides, water retention agents, and small amounts of solvents and/or dispersing auxiliaries, preferably carboxy-functional dispersing auxiliaries.

The acrylated acrylate resins can then be dispersed with the abovementioned dispersing auxiliaries by grinding to an average particle size of a few $\mu$m.

Particular preference is given to the wet grinding of a preliminary dispersion. To this end, prior to or following the substances B and further auxiliaries, the coating powders are dispersed in water using, for example, a high-speed dissolver. It is also possible first of all to add only some of substances B and auxiliaries and to meter in the remainder prior to or following subsequent dispersion and/or wet grinding. In certain cases the preliminary dispersion can be processed directly; in general, it is subjected to secondary grinding in appropriate mills, e.g., stirred ball mills, in order to establish the desired particle fineness. After the dispersing operation, the dispersion is ground, if desired, to a desired particle size spectrum and, if desired, the pH is adjusted to the level determined as a function of the system, and the resultant dispersion is filtered. A special advantage of the invention in comparison to powder coating materials is that even a very fine particle size spectrum can be processed, e.g. 1–3 $\mu$m, a level at which powder coating materials can no longer be applied, with the result of a surface quality (evenness) which cannot be achieved using powders.

Following the dispersion of component A in component B, the pH is adjusted preferably to 4.0 to 7.0 and, with particular preference, to 5.5 to 6.5.

The average particle size is between 1 and 200 $\mu$m, preferably below 20 $\mu$m and, with particular preference, from 2 to 10 $\mu$m. The solids content of the aqueous dispersion of transparent powder coating material is between 15 and 50%.

Before or after the wet grinding or the introduction of the dry powder coating material into the water, it is possible to add to the dispersion from 0.5% by weight of a defoamer mixture, an ammonium salt and/or alkali metal salt, a carboxy-functional or nonionic dispersing auxiliary, wetting agent and/or thickener mixture, and the other additives.

Preferably, in accordance with the invention, defoamers, dispersing auxiliaries, wetting agents and/or thickeners are first of all dispersed in water. Then small portions of the transparent powder coating material are stirred in. After that, defoamers, dispersing auxiliaries, thickeners and wetting agents are dispersed into the mixture once again. Finally, small portions of transparent powder coating materials are stirred in again.

In accordance with the invention, the pH is preferably adjusted using amines, especially in the case of anionically stabilized dispersions. In this context the pH may initially increase, so that a strongly basic dispersion is formed. Within several hours or days, however, the pH falls again to the values indicated above.

Also possible, however, are the dispersions stabilized cationically in the manner described above, where the pH is established using acids, preferably volatile carboxylic acids.

The dispersion of transparent powder coating material according to the invention can be used as a coating over basecoats, preferably in the automotive industry. The dispersion of transparent coating material is particularly suitable for waterborne basecoats based on a polyester, polyurethane resin and an amino resin.

Suitable substrates are all surfaces to be coated that are amenable to UV curing; in other words, for example, metals, plastics, wood, ceramic, stone, textiles, fiber composites, leather, glass, glass fibers, glasswool and rockwool, mineral-bound and resin-bound building materials, such as plasterboards and cement boards, and also roof tiles, and especially auto bodies. Dispersions of transparent powder coating material according to the invention are specifically suitable as coating over basecoats, preferably in the automotive industry. They are particularly suitable as clearcoats over waterborne basecoats based on polyesters, polyurethane resins and amino resins.

The UV powder coating dispersions applied to the substrates are first of all subjected to extensive preliminary drying prior to UV curing. This preliminary drying takes place at room temperature or, in accelerated form, at elevated temperature. The elevated temperature is generally from 40 to 70° C., preferably from 50 to 65° C. Preliminary drying is carried out for from 2 to 10 minutes, preferably from 4 to 8 minutes. Thereafter, the temperature is raised to the melting temperature of the resin particles, and, after a smooth surface has formed, crosslinking is carried out with high-energy radiation, preferably UV light. It is also possible to dispense with the preliminary drying and to carry out drying and melting in one step in a temperature program. A great advantage of the invention can be seen in that exposure at temperatures of 90 to 120° C. can be carried out at a level considerably below the typical stoving temperatures of from 140 to 180° C. At the low exposure temperature, water still present in the film does not interfere with curing and causes no boil marks or craters. The equilibrium between atmospheric moisture and film, which is a function of the material, is then established within a short time, as with all coatings.

The dispersions of transparent powder coating material according to the invention can be applied using the methods known from liquid coating technology. In particular, they can be applied by means of spraying techniques. Also suitable are electrostatically assisted high-speed rotation or pneumatic application.

With the process of the invention it is possible to obtain coat thicknesses of from 10 to 60, preferably from 20 to 60 and, with particular preference, from 20 to 50 $\mu$m, very preferably from 25 to 45 $\mu$m. In accordance with the prior art, coatings of comparable quality could previously be achieved only by applying coat thicknesses of from 65 to 80 μm when using transparent powder coating materials.

The invention is described in more detail below with reference to the examples, but without being restricted thereto:

1. UV-cocrosslinkable Polyacrylate Protective Colloid

The following components are charged to a stirred flask having a feed port and reflux condenser, under a gentle stream of nitrogen:

Initial Charge 144 parts of feed stream 1

136 parts of 2-butanone

Feed Stream 1

460 parts of butyl methacrylate 160 parts of methyl methacrylate 180 parts of acrylic acid Feed Stream 2

21.3 parts of t-butyl perpivalate (75% strength)

240 parts of 2-butanone

Procedure

Heat initial charge at reflux (about 80° C.), start feed stream 2 and meter it in over 5 hours; 15 minutes after beginning feed stream 2, start remainder of feed stream 1 and meter it in over the course of 3.5 hours. After the end of the additions, continue reflux for 2 hours, cool to 60° C., and add 128 parts of glycidyl methacrylate 3 parts of triphenylphosphine and hold at reflux for 2 hours, then cool to 60° C. and stir in Feed Stream 3

65 parts of dimethylethanolamine 1200 parts of water over the course of 30 minutes. This gives a viscous, slightly cloudy solution.

pH 9.5

Solids content 33.8%

2. Preparation of a UV Powder Coating Acrylate Resin 400 parts of isobutanol are initially introduced under nitrogen and this initial charge is heated at reflux; then, at about 105 to 108° C., a mixture of 270 parts of methyl methacrylate 300 parts of dlcyclopentedienol acrylate 200 parts of styrene 50 parts of 2-ethylhexyl acrylate 30 parts of acrylic acid 150 parts of the compound of formula I

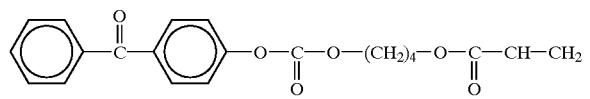

30 parts of tert-butyl peroctoate are run in over the course of 1 hour at constant rate, with stirring.

20 minutes after the end of the addition, a further 20 parts of tert-butyl peroctoate are added over the course of 15 minutes and polymerization is continued for 3 hours. The major part of the solvent was then removed from the viscous resin solution under reduced pressure by distillation, until the melting temperature was 140° C. The hot melt was poured into a porcelain dish lined with aluminum foil and was dried in a vacuum cabinet at about 80° C. for 48 hours. The resultant brittle resin was knocked off from the foils and coarsely comminuted.

3. Preparation of the UV Powder Coating Material 450 parts of acrylate resin according to 2.

1.0 part of Tinuvin 144 (HALS)

4.5 parts of Additol XL 490 (leveling agent) and 1.5 parts of benzoin (devolatilizing agent)

are intimately mixed on a Henschel fluid mixer, this mixture is extruded on a BUSS PLK 46 extruder, and the extrudate is ground in a Hosokawa Acm 2 mill and classified through a 125 μm sieve.

4. Preparation of a UV Powder Coating Dispersion 500 parts of deionized water 0.6 part of Troykyd D777 (defoamer)

0.6 part of Orotan 731 K (dispersing auxiliary)

0.2 part of Surfinol TMN 6 (wetting agent)

100 parts of UV-cocrosslinkable polyacrylate protective colloid according to 1.

are mixed in a high-speed stirrer, and then 200 parts of the UV powder coating material according to 3. are incorporated by stirring.

The resultant dispersion was then ground in a laboratory stirred ball mill until an average particle size of 8 μm was reached. The particles were then filtered through a 50 μm filter.

5. Application and Testing

The dispersion according to 4. Was applied to degreased aluminum panels using a knife coater having a gap height of 80 μm. The panels were placed on a regulatable hotplate which stood under a mercury vapor UV lamp having an emission maximum at about 365 nm. The lamp was switched on but was first of all closed off with a cover slice. The temperature of the hot plate was increased from about 23° C. to 120° C. over the course of 20 minutes. At about 70° C., the initially milky white coating became clear and gradually underwent transition to a melt. At 120° C., a melt had formed which had flowed out smoothly. At this point, the occluding slide of the UV lamp was opened for 45 seconds. The panels were removed from the hotplate and cooled. This resulted in hard, glossy coatings which showed no sign of attack following 50 strokes with a cotton pad moistened with methyl ethyl ketone. The coat thickness was 26 to 34 μm.

We claim:

1. A process comprising:

a) applying an aqueous dispersion to a substrate, wherein the dispersion comprises a solid pulverulent component A as disperse phase, and an aqueous component B as continuous phase, wherein component A comprises a UV-curable powder coating material;

b) heating the dispersion and melting the powder coating material to form a film, wherein at least a portion of the water is not removed prior to the melting, and c) applying ultraviolet radiation to crosslink the film.

2. The process of claim 1, wherein a portion of the water is evaporated from the dispersion prior to melting.

3. The process of claim 1, wherein water is not removed prior to the melting.

4. The process of claim 1, wherein the dispersion is prepared by a process comprising:

a) preparing a dispersion from the solid pulverulent component A and the component B, and b) grinding the resulting dispersion;

c) adjusting the pH to a desired pH with a pH agent, and d) filtering the dispersion.

5. The process of claim 1, wherein component A comprises at least one UV-curable solid binder and a compound selected from the group consisting of pigments, dyes, and mixtures thereof.

6. The process of claim 1, wherein component A comprises a mixture of unsaturated polymers and polymers having a fraction of photochemically excitable, copolymeric photoinitiators.

7. The process of claim 1, wherein component A further comprises a compound selected from the group consisting of catalysts, devolatilizing agents, leveling agents, UV absorbers, free-radical scavengers, antioxidants, biocides, wetting agents, and mixtures thereof.

8. The process of claim 1, wherein component B comprises at least one of a thickener, a dispersion auxiliary, a neutralizing agent, a solvent, and a water retention agent.

9. The process of claim 8, wherein the thickener comprises a nonionic thickener comprising at least one nonionic associative thickener whose structural features comprise i) a hydrophilic structure and ii) hydrophobic groups cable of associative interaction in an aqueous medium.

10. The process of claim 9, wherein the thickener is a nonionic associative thickener comprising as the hydrophilic structure (i) polyurethane chains.

11. The process of claim 1, wherein component A further comprises a photoinitiator.

12. The process of claim 11, wherein the photoinitiator is a polymer-bonded photoinitiator.

13. The process of claim 1, wherein component A further comprises a UV stabilizer.

14. The process of claim 1, wherein component B further comprises a photoinitiator.

15. The process of claim 14, wherein the photoinitialor is a polymer-bonded photoinitiator.

16. The process of claim 1, wherein component B further comprises a UV stabilizer.

17. The process of claim 1, wherein component A and component B each further comprise a photoinitiator.

18. The process of claim 1, wherein component A and component B each further comprise a UV stabilizer.

19. The process of claim 1, wherein component B further comprises compounds selected from the group consisting of catalysts, devolatilizing agents, leveling agents, UV absorbers, free-radical scavengers, antioxidants, biocides, solvents, wetting agents, and mixtures thereof.

20. The process of claim 19, wherein the wetting agent is selected from the group consisting of straight-chain aliphatic dicarboxylic acids, carboxy-functional polyesters, and mixtures thereof.

21. The process of claim 19, wherein component B comprises an amine neutralizing agent.

22. The process of claim 7, wherein the wetting agent is selected from the group consisting of straight-chain aliphatic dicarboxylic acids, carboxy-functional polyesters, and mixtures thereof.

23. The process of claim 7, wherein component B further comprises an amine neutralizing agent.

24. The process of claim 1, wherein component A further comprises a compound selected from the group consisting of catalysts devolatilizing agents, leveling agents, UV absorbers, free-radical scavengers, antioxidants, biocides, wetting agents, and mixtures thereof, and component B further comprises a compound selected from the group consisting of catalysts, devolatilizing agents, leveling agents, UV absorbers, free-radical scavengers, antioxidants, biocides, solvents, wetting agents, and mixtures thereof.

25. The process of claim 24, wherein the wetting agent is selected from the group consisting of straight-chain aliphatic dicarboxylic acids, carboxy-functional polyesters, and mixtures thereof.

26. The process of claim 24, wherein component B further comprises an amine neutralizing agent.

* * * * *